(12) United States Patent
Nazuka et al.

(10) Patent No.: US 11,991,430 B2
(45) Date of Patent: May 21, 2024

(54) WEARABLE APPARATUS

(71) Applicant: TOPPAN PRINTING CO., LTD., Tokyo (JP)

(72) Inventors: Ichiro Nazuka, Taito-ku (JP); Takashi Ogino, Taito-ku (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 277 days.

(21) Appl. No.: 17/443,394

(22) Filed: Jul. 26, 2021

(65) Prior Publication Data

US 2021/0352194 A1 Nov. 11, 2021

Related U.S. Application Data

(63) Continuation of application No. PCT/JP2020/002576, filed on Jan. 24, 2020.

(51) Int. Cl.
*H04N 23/54* (2023.01)
*H04R 1/02* (2006.01)
*H04R 1/08* (2006.01)

(52) U.S. Cl.
CPC ............... *H04N 23/54* (2023.01); *H04R 1/02* (2013.01); *H04R 1/08* (2013.01)

(58) Field of Classification Search
CPC . H04N 23/54; H04R 1/02; H04R 1/08; F16M 2200/06; F16M 11/041; F16M 11/048; F16M 11/06; F16M 13/04; G03B 17/561
See application file for complete search history.

(56) References Cited

U.S. PATENT DOCUMENTS

| 9,833,058 B2 * | 12/2017 | Bryant ..................... A45F 3/14 |
| 2007/0003093 A1 | 1/2007 | Ito et al. |
| 2018/0224725 A1 | 8/2018 | Jeong |

FOREIGN PATENT DOCUMENTS

| JP | 2001-282391 A | 10/2001 |
| JP | 2007-013873 A | 1/2007 |
| JP | 2016-161934 A | 9/2016 |
| JP | 3209658 U | 3/2017 |
| KR | 200482913 Y1 | 3/2017 |

OTHER PUBLICATIONS

International Search Report dated Apr. 7, 2020 in PCT/JP2020/002576, filed Jan. 24, 2020, 5 pages (with English Translation).

* cited by examiner

*Primary Examiner* — Yogesh K Aggarwal
(74) *Attorney, Agent, or Firm* — Oblon, McClelland, Maier & Neustadt, L.L.P.

(57) ABSTRACT

A wearable apparatus includes a body having a U-shape. The body includes a curved portion, a first side portion, and a second side portion, the curved portion having a first end and a second end, the first side portion extending from the first end, and the second side portion extending from the second end, the body is wearable such that the curved portion is worn on a nape of a neck of a user, and that the first and second side portions are suspended from shoulders of the user. The body has a first end of the first side portion, and has a second end of the second side portion. A terminal device having an image capture function and a communication function is mountable on at least one of the first end at the first side portion and the second end at the second side portion.

20 Claims, 6 Drawing Sheets

WEARABLE APPARATUS

CROSS-REFERENCE TO RELATED APPLICATIONS

The present application is a continuation of International Application No. PCT/JP2020/002576, filed Jan. 24, 2020, which is based upon and claims the benefits of priority to Japanese Application No. 2019-010546, filed Jan. 24, 2019. The entire contents of all of the above applications are incorporated herein by reference.

BACKGROUND OF THE INVENTION

Field of the Invention

The present disclosure generally relates to a wearable apparatus wearable on a human body.

Discussion of the Background

A large number of developments of wearable apparatuses which are wearable on the head or neck of a human body have been made. Such a wearable apparatus for example has an image capture function for capturing images of the surroundings of a wearer of the wearable apparatus. The wearable apparatus further includes a communication function to perform data communication of image data between the wearable apparatus and an external device (e.g., see JP 3209658 U).

SUMMARY OF THE INVENTION

According to an aspect of the present invention, a wearable apparatus includes a body having a U-shape, a curved portion, a first side portion, and a second side portion, the curved portion having a first end and a second end, the first side portion extending from the first end of the curved portion, and the second side portion extending from the second end of the curved portion, the body being wearable such that the curved portion is worn on a nape of a neck of a user, and that the first side portion and the second side portion are suspended from shoulders of the user. The body has a first end that is an end of the first side portion, and a second end that is an end of the second side portion, and the body is structured such that a terminal device having an image capture function and a communication function is mountable to at least one of the first end of the first side portion and the second end of the second side portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
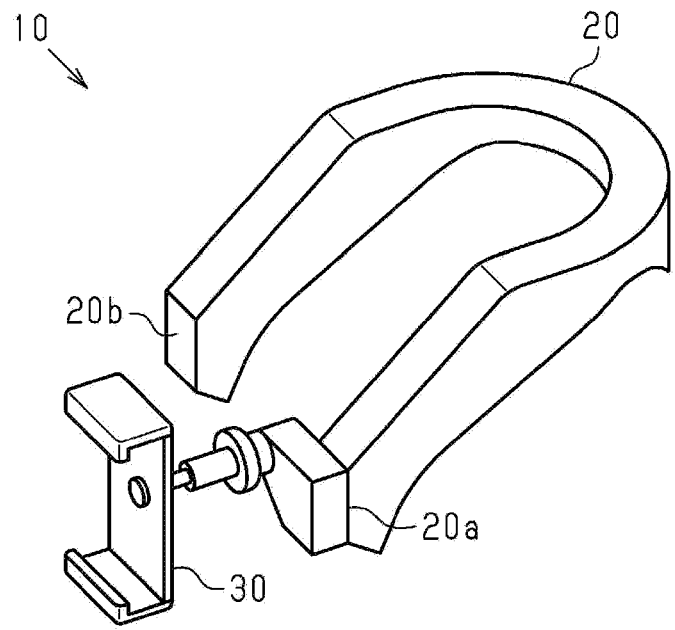
FIG. 1 illustrates a perspective view of the structure of the wearable apparatus according to an embodiment of the wearable apparatus.

The embodiments will now be described with reference to the accompanying drawings, wherein like reference numerals designate corresponding or identical elements throughout the various drawings.

With reference to FIGS. 1 to 8, an embodiment of the wearable apparatus will be described. Up, down, left, right, front, and back directions in the following description correspond to directions as viewed by the user wearing the wearable apparatus.

<Overall Configuration>

As shown in FIG. 1, a wearable apparatus 10 includes a body 20 mountable around a neck of a user, and a support 30 configured to support an image capture terminal device.

The body 20 is a U-shaped structure and has two ends in a length direction of the body. The two ends are defined as a first end 20a and a second end 20b. The body 20 has a portion which functions as a housing for electronic components or the like. The portion has a structure which extends in an arch shape from the first end 20a to the second end 20b.

The support 30 is connected to the first end 20a of the body 20. The support 30 supports the image capture terminal device, that is, the image capture terminal device is mounted to the first end 20a via the support 30. The image capture terminal device is a terminal device having an image capture function and a communication function. Such a device may be for example a smartphone.

<Support>

Figure 2:
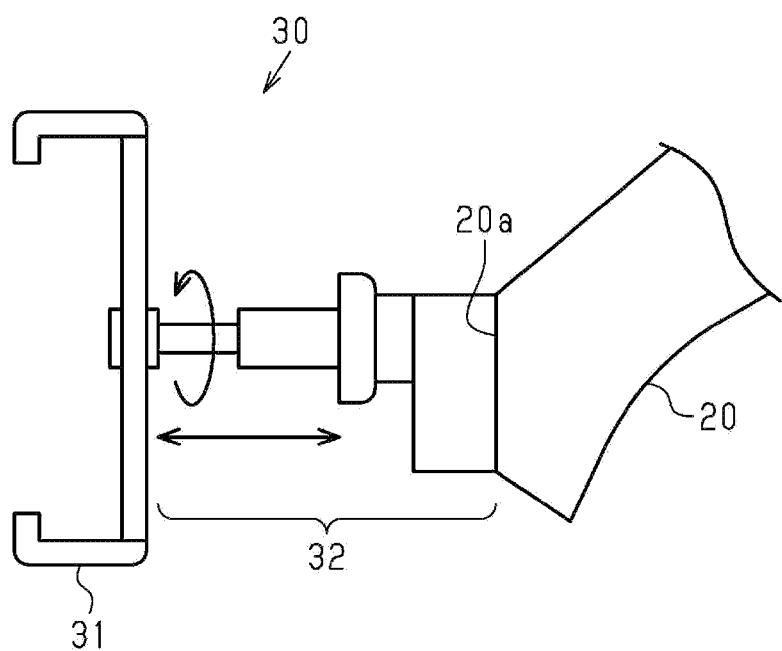
FIG. 2 illustrates a side view of the structure of the vicinity of a support of the wearable device according to an embodiment.

The detailed configuration of the support 30 will now be described. As shown in FIG. 2, the support 30 has a holder 31 and a connector 32, the holder 31 holding the image capture terminal device, the connector 32 connecting to the body 20 by extending from the holder 31 and having an adjustment function to adjust a position or an angle of the support 31.

The holder 31 holds the image capture terminal device by for example sandwiching the image capture terminal device. The connector 32 adjusts a position or an angle of the holder 31 relative to the first end 20a. Specifically, the connector 32 includes a sliding mechanism to change the length of the connector 32 in a direction in which the connector 32 extends, that is, a direction from the first end 20a to the holder 31. The mechanism for changing the length of the connector 32 is not limited to a sliding mechanism. An alternative mechanism is, for example, a mechanism in which the connector 32 is folded a plurality of times, and by straightening the folds, the length of the connector 32 is increased in a direction from the first end 20a to the hold 31. By changing the length of the connector 32, a distance from the first end 20a to the holder 31 can be changed. Thus, a position of the holder 31 to the first end 20a can be changed.

The connector 32 includes a rotating mechanism in which the holder 31 is rotatable relative to the first end 20a about an axial direction which is a direction in which the connector 32 extends. Furthermore, an angle of the holder 31 with respect to a plane orthogonal to the axial direction may be changeable. According to such a configuration, the angle of the holder 31 to the first end 20a can be adjusted.

Figure 3:
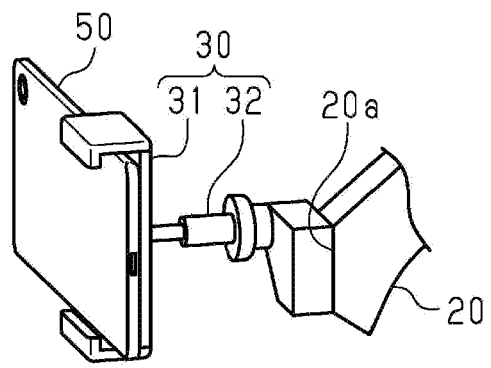
FIG. 3 illustrates a structure around the support in a state in which an image capture terminal device is mounted on the wearable apparatus according to an embodiment.

FIG. 3 shows a state in which the image capture terminal device 50 is mounted to the support 30. The image capture terminal device 50 is mounted such that a camera which configures an image capture unit is positioned facing away from the body 20 with respect to the support 30. Changing of the position or the angle of the holder 31 with respect to the first end 20a corresponds to changing of the position or the angle of the image capture terminal device 50 with respect to the first end 20a.

<Body>

A detailed description will be given of the body 20 and some parts accommodated in the body 20.

Figure 4:
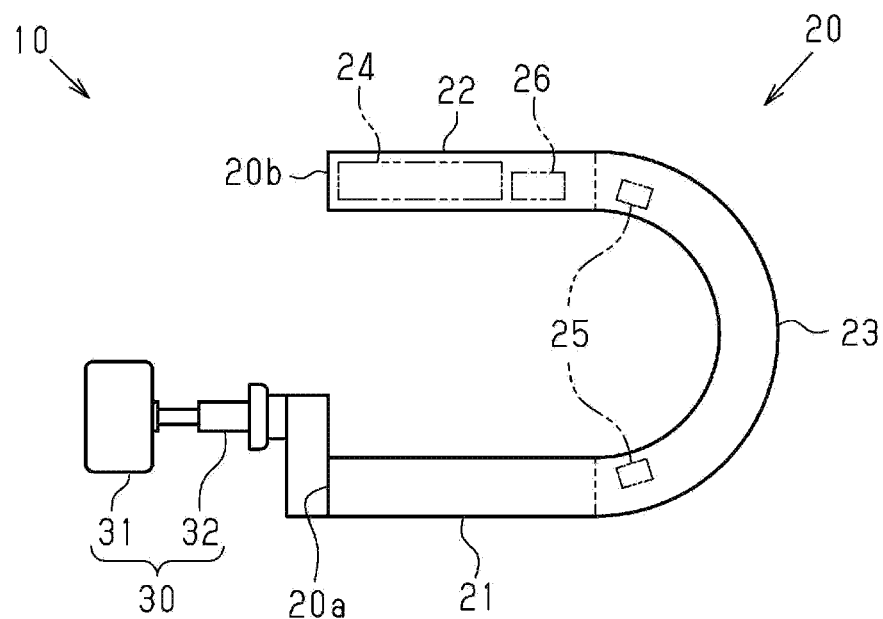
FIG. 4 illustrates a front view of the structure of the wearable apparatus according to an embodiment.

As shown in FIG. 4, the body 20 is provided with a first side portion 21 including the first end 20a and extending from the first end 20a, a second side portion 22 including the second end 20b and extending from the second end 20b, and a curved portion 23 extending in an arc shape connecting the first side portion 21 with the second side portion 22. That is, the curved portion 23 is a portion having a curve in the U-shaped body 20, and from a first curved portion end of the curved portion 23, the first side portion 21 extends substantially linearly, and from a second curved portion end of the curved portion 23, the second side portion 22 extends substantially linearly. When the body 20 is viewed from a position facing to an upper surface of the body 20, the first side portion 21 to which the image capture terminal device 50 is mountable may be extended from the right end portion of the curved portion 23 or may be extended from the left end portion thereof.

A material of the body 20 is not particularly limited. A part or the entire body 20 may be formed from resin, metal, leather, wood, glass, and paper such as a corrugated cardboard. The surface of the body 20 may be covered by, for example, cloth or rubber, for improving the decoration or feel on skin. A central region of the length of the curved portion 23 is preferably configured such that the curved portion 23 can be expanded so that the curvature radius of the curve increases. For example, the central region may be configured of an elastic member or a bellows-shaped structure which is stretchable. When the wearable apparatus 10 is worn by the user, the user firstly unfolds the curved portion 23 and places the body 20 around the neck of the user. Then, the curved portion 23 is narrowed to return the curved portion 23 to the original shape. This allows the user to put on the wearable apparatus 10 easily.

The second side portion 22 of the wearable apparatus 10 includes a housing 24 which houses a battery for supplying electric power to the image capture terminal device 50. The housing 24 includes a space for accommodating the battery, and a terminal connector for connecting a terminal such as a USB terminal of the battery. A wiring extending from the terminal connector runs thorough the inside of the curved portion 23 and emerges to the outside of the body 20 from the vicinity of the first end 20a to be connected to the image capture terminal device 50. Alternatively, a terminal connector connected to the wiring may be provided in the vicinity of the first end 20a. The terminal connector and the image capture terminal device 50 are connected by an optional wiring such as a cable. The battery housed in the housing 24 and the image capture terminal device 50 are thus electrically connected.

An auxiliary member which adjusts a size of the space accommodating the battery may be mountable to the housing 24 so that various sizes of batteries can be accommodated. As for the housing 24, instead of the configuration in which the battery is accommodated inside the second side portion 22, the battery may be accommodated on the surface of the second side portion 22. For example, the housing 24 may have a concavity on the surface of the second side portion 22. The battery may thus be fitted to the concave so that the battery is housed in the housing 24.

The wearable apparatus 10 includes a sound emitter 25 and a sound receiver 26. The sound emitter 25 includes a speaker unit to emit sound in response to a signal from the image capture terminal device 50. The sound receiver 26 includes a microphone unit to convert externally inputted sound into a signal and output the signal to the image capture terminal device 50.

The sound emitter 25 may preferably be arranged in a portion of the body 20 around an ear of the user in a state in which the wearable apparatus 10 is worn on the user. For example, the sound emitter 25 may be located at least one of in the vicinity of a boundary between the first side portion 21 and the curved portion 23, and in the vicinity of boundary between the second side portion 22 and the curved portion 23, and may be accommodated in the body 20.

The sound receiver 26 may be arranged in a portion of the body 20 corresponding to the vicinity of a mouth of the user when the wearable apparatus 10 is worn on the user. Alternatively, the sound receiver 26 may be accommodated inside the body 20 so that the sound receiver may be pulled out to the surroundings of the mouth of the user when used. For example, the sound receiver 26 may be arranged near the second end 20b of the second side portion 22.

The wiring for transmitting and receiving a signal between the sound emitter 25 and the sound receiver 26, and the image capture terminal device 50 runs through the inside of the body 20 and emerges to the outside of the body 20 from the vicinity of the first end 20a to be connected to an earphone jack or the like of the image capture terminal device 50. Alternatively, the terminal connector connected with the wiring may be provided near the first end 20a. The terminal connector and the image capture terminal device 50 are connected by an optional wiring such as a cable. The sound receiver 25 and the sound emitter 26, and the image capture terminal device 50 are thus electrically connected. The wiring and the terminal connector for connecting the sound emitter 25 with the image capture terminal device 50, and the wiring and the terminal connector for connecting the sound receiver 26 with the image capture terminal device 50 may be shared between them, or an independent wiring and terminal connector may be used.

Each of the sound emitter 25 and the sound receiver 26, and the image capture terminal device 50, may perform signal transmission and reception using short-range wireless communication such as Bluetooth (registered trademark). In this case, the wearable apparatus 10 includes a wireless communication unit (wireless communication circuit) and an electric power supply unit. The wireless communication unit connects each of the sound emitter 25 and the sound receiver 26 with the image capture terminal device 50 using wireless communication to perform communication and control. The electric power supply unit supplies electric power to the wireless communication unit. The wireless communication unit and the electric power supply unit are housed in the body 20. The electric power supply unit may be a primary battery, a secondary battery, or a capacitor.

The wearable apparatus 10 may include at least one of a vibration generation unit, an airflow generation part, and a scent generation unit in addition to the above units. The vibration generation unit generates vibration to the body 20. The airflow generation unit generates airflow from the body 20 toward the user. The scent generation unit generates a scent. The vibration generation unit includes a vibrator which vibrates in accordance with a signal from the image capture terminal device 50. The airflow generation unit includes a fan which rotates in accordance with a signal from the image capture terminal device 50. The scent generation unit includes a perfume. For example, the scent generation unit may lie in the path of an airflow which is generated by the airflow generation unit. With this configuration, a scented airflow can be generated in accordance with a signal from the image capture terminal device 50. In this way, the wearable device 10 can generate vibration, airflow, and scents, which enhances the sense of presence and degree of interest when the user exchanges information through the image capture terminal device 50.

The wearable apparatus 10 may be provided with an electric power generation unit which includes a solar cell. The solar cell may for example be arranged on the upper surface of the body 20. The electric power generated by the electric power generation unit is provided to the image capture terminal device 50 via wiring, or to the electric power supply unit.

The remaining space for housing the units described above in the interior of the body 20 may be a void or may be filled with an optional material. As for a weight per volume only of the body 20 excluding various electronic components accommodated in the body 20, that is, a density of the body 20, the body 20 is preferably configured such that a central portion of a length of the body 20 has the largest in density. The body 20 is preferably configured such that the density decreases from the central portion to each of the first end 20a and the second end 20b.

Figure 5:
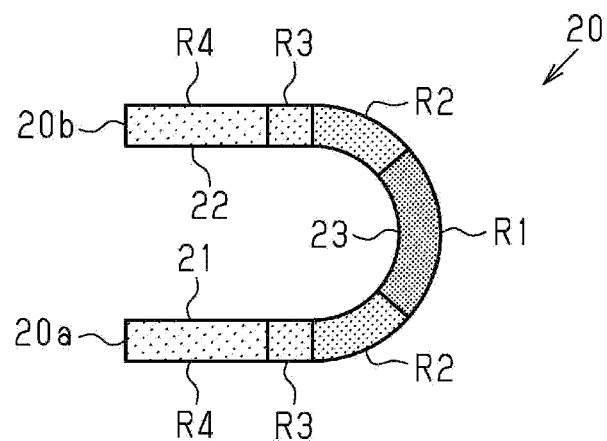
FIG. 5 illustrates an example of density distribution of a body of the wearable apparatus according to an embodiment.

For example, as shown in FIG. 5, the body 20 includes four kinds of regions which are different in density: a high density region R1, medium density regions R2, low density regions R3, very low density regions R4. R1 has the highest in density, and the density decreases in the order of the high density region R1, the medium density region R2, the low density region R3, and the very low density region R4.

The high density region R1 is located at a region including the center of the curved portion 23 in the extending direction of the body 20. The medium density region R2, the low density region R3, and the very low density region R4 lie in this order from the high density region R1 to the first end 20a. The medium density region R2, the low density region R3, and the very low density region R4 also lie in this order from the high density region R1 to the second end 20b.

The regions R1 to R4 having different density are produced for example by the interior of the body 20 being configured by a honeycomb structure such that spaces in the honeycomb structure in a cross sectional area of regions constituting the honeycomb structure are the smallest in the high density region R1 and increase in an order of the high density region R1, the medium density region R2, and the low density region R3. The very low density region R4 may be hollow, and the housing 24 is preferably arranged in the very low density region R4.

If the density of the body 20 is uniform, a center of gravity of the wearable apparatus 10 tends be located in the vicinity of the first end 20a and the second end 20b of the body 20 in a state in which the image capture terminal device 50 is mounted on the first end 20a and the battery is housed in the housing 24. As a result, when the wearable apparatus 10 is worn by the user, the wearable apparatus 10 tends to drop forward. Thus, a load applied to the nape of the neck of the user is increased, and this tends to increase a burden on the user. In contrast, if the density decreases from the central portion of the curved portion 23 which is arranged at the nape of the neck of the user toward each of the first end 20a and the second end 20b, the center of gravity of the wearable apparatus 10 is prevented from being more on either end when worn by the user. Accordingly, the position of the wearable apparatus 10 can easily be stabilized, and the load applied to the nape of the neck of the user is mitigated.

A ratio of each region R1 to R4 and the difference in density may be determined according to a weight of the image capture terminal device 50 and the battery mounted on the wearable apparatus 10.

If the battery is housed in the vicinity of the second end 20b which is the opposite end to the first end 20a where the image capture terminal device 50 is mounted, the center of gravity of the wearable apparatus 10 is prevented from being unbalanced to either of left and right. Thus, the position of the wearable apparatus 10 can easily be stabilized when the wearable apparatus 10 is worn by the user. If there is a large difference in weight between the image capture terminal device 50 and the battery, that is, if the weight on the left and right cannot be balanced only by accommodating the battery on an end opposite to the image capture terminal device 50, a weight may be added to the inside of either the first side portion 21 or the second side portion 22 to produce a difference in weight relative to the other side portion. For the front-rear weight balance, the weight of the body 20 may be adjusted so that the central region of the curved portion 23 is heavier than the rest of the body 20 by changing the thicknesses of the curved portion 23 and the side portions 21 and 22, or by adding a weight to the curved portion 23, instead of changing the density of the body 20 as described above, or in addition to changing the density of the body 20.

<Electrical Configuration>

The electrical configuration of the wearable apparatus 10 and the image capture terminal device 50 will now be described.

Figure 6:
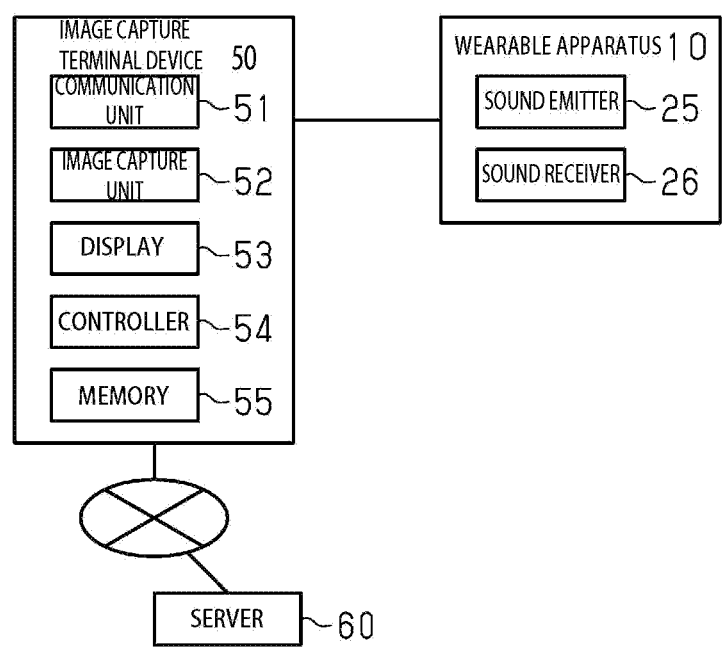
FIG. 6 illustrates electrical configuration of the wearable apparatus and the image capture terminal device according to an embodiment.

As shown in FIG. 6, the image capture terminal device 50 is connected to a network, and the image capture terminal device 50 and an external device which is for example a server 60 transmit and receive data reciprocally via the network. The network may be a general communication network such as the Internet, or may be a communication line exclusively for communication between the image capture terminal device 50 and the external device.

The image capture terminal device 50 includes a communication unit 51, an image capture unit 52, a display 53, a controller 54, and a memory 55.

The communication unit 51 connects the image capture terminal device 50 with a server 60 via a network. Then, the communication unit 51 transmits and receives data between the image capture terminal device 50 and the server 60.

The image capture unit 52 includes a camera which captures images of the vicinity of the image capture terminal device 50, and generates image data that is data that is still or moving image data. The image data is transmitted to the server 60 via the communication unit 51.

The display 53 includes a display panel such as a liquid crystal panel for displaying an image. For example, the display 53 can display at least one of images captured by the image capture unit 52 and images which the communication unit 51 receives from the server 60.

The controller 54 includes a configuration having a CPU and a volatile memory such as a RAM. Based on programs or data stored in the memory 55, the controller 54 controls processing performed by the communication unit 51, image capture unit 52, and display 53, and controls output of signals to the wearable apparatus 10.

The memory 55 includes a configuration having a non-volatile memory, and stores program or data necessary for processing performed by the controller 54.

The image capture terminal device 50, and the sound emitter 25 and the sound receiver 26 which are included in the wearable apparatus 10 are connected through a wire or wirelessly. If transmission or reception of signals between the image capture terminal device 50, and the sound emitter 25 and the sound receiver 26, is performed by wireless communication, the image capture terminal device 50 includes a wireless communication unit which transmits or receives signals by connecting the image capture terminal device 50 with the wearable apparatus 10 using wireless communication.

The sound emitter 25 of the wearable apparatus 10 emits sound in response to signals from the controller 54 of the image capture terminal device 50. The sound receiver 26 converts externally inputted sounds into signals, to output the signals to the controller 54.

The server 60 executes predetermined processing on the image data received from the image capture terminal device 50. For example, the server 60 transmits the image data to a display device such as a large display to display images based on the image data on the display device. Furthermore, for example, the server 60 may transmit data such as images of a region around the display device to the image capture terminal device 50 to display images based on the data on the display 53 of the image capture terminal device 50.

The external device to which the image capture terminal device 50 transmits the image data is not limited to the server 60 but may be a display device or a personal computer.

<Utilization Mode>

Figure 7:
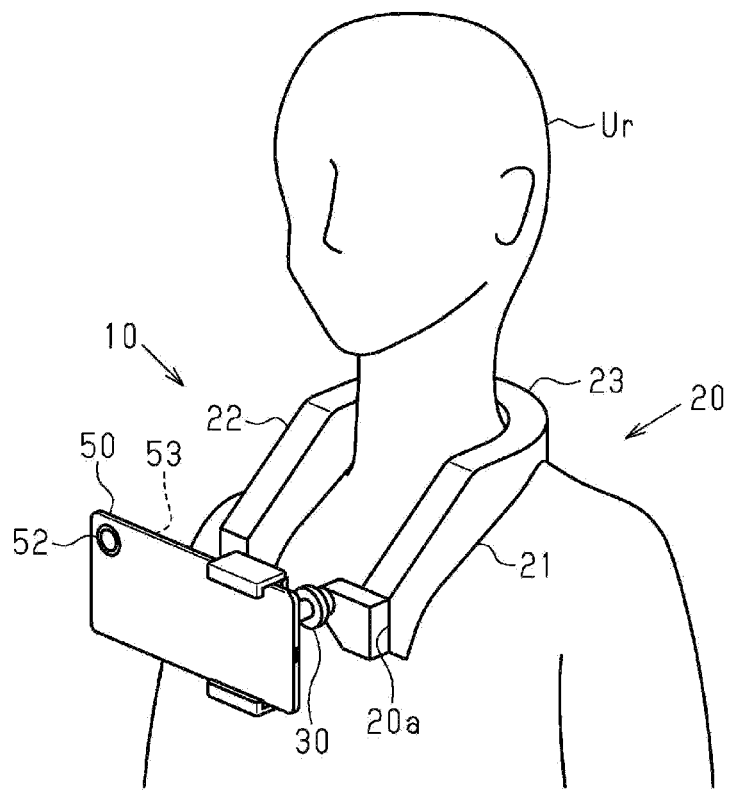
FIG. 7 illustrates a state where the wearable apparatus according to an embodiment is worn by a user.

A utilization mode for the wearable apparatus 10 will now be described. FIG. 7 illustrates a user Ur who wears the wearable apparatus 10 which has mounted thereon a smartphone serving as the image capture terminal device 50. The body 20 is worn on the shoulders and around the neck of the user Ur. The curved portion 23 is worn on the nape of the neck of the user Ur, and the first side portion 21 and the second side portion 22 hang down from the shoulders and forward to the chest. The bottom surface of the body 20 preferably has a curved surface shape that follows the shape of the shoulders. With this configuration, since the body 20 easily follows the shape of the shoulders, the position of the wearable apparatus 10 is likely to be stable.

The image capture terminal device 50 is assembled to the support 30 connected to the first end 20*a*. The camera constituting the image capture unit 52 of the image capture terminal device 50 is directed ahead of the user Ur, and the display 53 is directed toward the user Ur. That is, the display 53 is arranged in a position visible to the user Ur. Further-more, a lens may be assembled to the image capture terminal device 50 for adjusting an angle of view of the image capture unit 52.

The wearable apparatus 10 according to the present embodiment is configured such that the image capture terminal device 50 having the image capture function and the communication function are mountable thereto. By using the functions of the image capture terminal device 50, the image data is transmitted. That is, the wearable apparatus 10 itself does not include an image capture function or an image data transmission function. With this configuration, for example, by mounting an image capture terminal device 50 relating to a new technology, the image capture function and the communication function can be enhanced. Thus, the wearable apparatus 10 can flexibly adapt to technological changes. As the image capture terminal device 50, a terminal device such as a smartphone is used. Such a device is prevalent and can easily adapt to technological changes. Thus, compared to the case in which the wearable apparatus 10 itself is replaced, the burden on the user is small.

Figure 8:
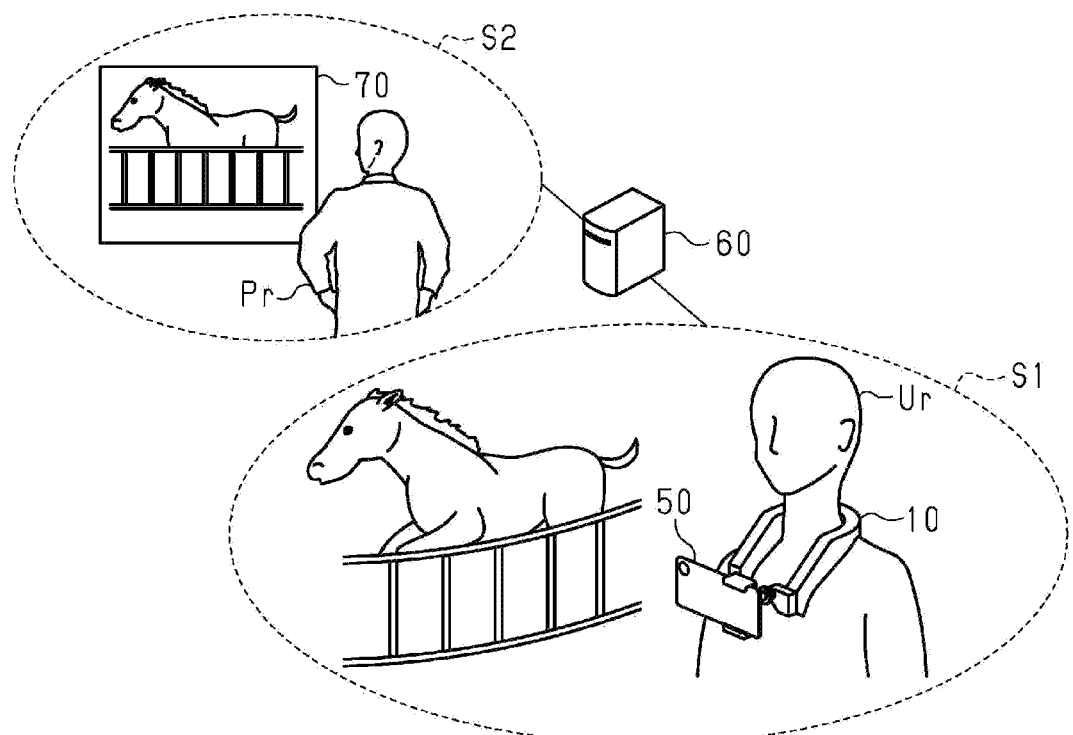
FIG. 8 illustrates an example of a utilization environment of the wearable device according to an embodiment.

With reference to FIG. 8, an example of a utilization environment of the wearable apparatus 10 will be described. The wearable apparatus 10 may be used for remote communication, for example. Specific examples include work related to meetings, medical treatment, and tourism.

As shown in FIG. 8, image data generated in response to the image capture terminal device 50 capturing the surroundings of the image capture terminal device 50 may be transmitted via the server 60 to a display device 70 which is present in a second space S2 apart from a first space 51 where the user Ur is present. Then, the display device 70 displays an image based on the image data received by the display device 70. A viewer Pr of the display device 70 can recognize a situation in the first space 51 by viewing the display device 70.

In particular, the image capture area captured by the image capture terminal device 50 is an area centered on the vicinity of the front of the chest of the user Ur, and moves with the movement of the user Ur. Thus, the viewer Pr can grasp a situation in the first space 51 by viewing the display device 70, that is, the viewer Pr can have an experience as if the viewer Pr is in the first space 51.

A sound uttered by the user Ur is received by the sound receiver 26 of the wearable apparatus 10, and transmitted to the viewer Pr via the server 60 and a speaker which is located at the second space S2. A sound uttered by the viewer Pr is received by a microphone which is located in the second space S2, and outputted to the sound emitter 25 of the wearable apparatus 10 via the server 60 to be transmitted to the user Ur. With this configuration, the user Ur and the viewer Pr who are in separate spaces can communicate with each other via the sound. For example, the viewer Pr can instruct the user Ur to change image capture area of the image capture terminal device 50.

If the wearable apparatus 10 includes a vibration generation unit, the user Ur may be instructed by vibration of a vibrator. For example, the vibrators may be arranged in each of the interiors of the first side portion 21 and the second side portion 22. If the viewer Pr requests the image capture area of the image capture terminal device 50 to be moved to the right, a signal is transmitted to the image capture terminal device 50 in response to an operation of an operator by the viewer Pr located in the second space S2. The image capture terminal device 50 which receives the signal then transmits the signal to the wearable apparatus 10 so that the vibrator located in a right side portion which is one of the first side portion 21 and the second side portion 22 is vibrated.

Transmission and reception of signals between the image capture terminal device 50 and the wearable apparatus 10 may be performed through a wire or wirelessly. Thus, the right side of the body 20 is vibrated, and this vibration is transmitted to the user Ur. If the user Ur moves toward a direction in which the user Ur feels the vibration, the image capture area of the image capture terminal device 50 moves in response to the intention of the viewer Pr. With this configuration, an instruction to the user Ur can easily be transmitted to the user Ur intuitively.

The image data which is captured by an imaging device positioned in the second space S2 is transmitted to the image capture terminal device 50 via the server 60 to display images on the display 53. With this configuration, the user Ur can recognize the situation in the second space S2. Thus, the viewer Pr and the user Ur can communicate smoothly. In a configuration in which the images captured by the image capture terminal device 50 are displayed on the display 53, the user Ur can recognize the imaging status of the image capture terminal device 50. Accordingly, the present configuration provides high convenience for adjusting the image capture area of the image capture terminal device 50.

As described above, the wearable apparatus 10 of the present embodiment achieves the following effects.

(1) The wearable apparatus 10 is configured such that the image capture terminal device 50 is mountable at the end of the wearable apparatus 10. Thus, since the imaging function and the communication function can be changed by exchanging the image capture terminal device 50, it is possible to flexibly respond to changes in technology.

(2) The support 30 supports the image capture terminal device 50 such that the position and the angle of the image capture terminal device 50 relative to the body 20 are changeable. With this configuration, the position and the angle of the image capture terminal device 50 can be adjusted by using the support 30 to adjust the image capture area of the image capture terminal device 50. Thus, the user experiences enhanced convenience.

(3) The body 20 includes the housing 24 which houses the battery in the second side portion 22 which extends from an end opposite to the end where the image capture terminal device 50 is mounted. With this configuration, when the image capture terminal device 50 and the battery are mounted on the wearable apparatus 10, that is, when the wearable apparatus 10 is used, the center of gravity of the wearable apparatus 10 is prevented from being unbalanced to either of left and right. Thus, the position of the wearable apparatus 10 can easily be stabilized when worn by the user.

(4) The wearable apparatus 10 includes the sound emitter 25 and the sound receiver 26. Therefore, communication using sound is possible through transmission and reception of sound information using the image capture terminal device 50.

(5) If the density of the body 20 is the largest in the central portion of the extending direction of the body 20, the center of gravity is prevented from being biased forward of the user when the image capture terminal device 50 and the battery are assembled to the wearable apparatus 10, that is, when the wearable apparatus 10 is used. Accordingly, the position of the wearable apparatus 10 can easily be stabilized when worn by the user, and the burden applied to the nape of the neck of the user is reduced. Furthermore, if the density of the body 20 decreases from the central portion to each of the first end 20a and the second end 20b, the center of gravity is more accurately prevented from being biased forward of the user. Thus, the above-described effect is further enhanced.

<Modifications>

The above-described embodiments can be implemented with modifications as described below.

(First Modification)

Figure 9:
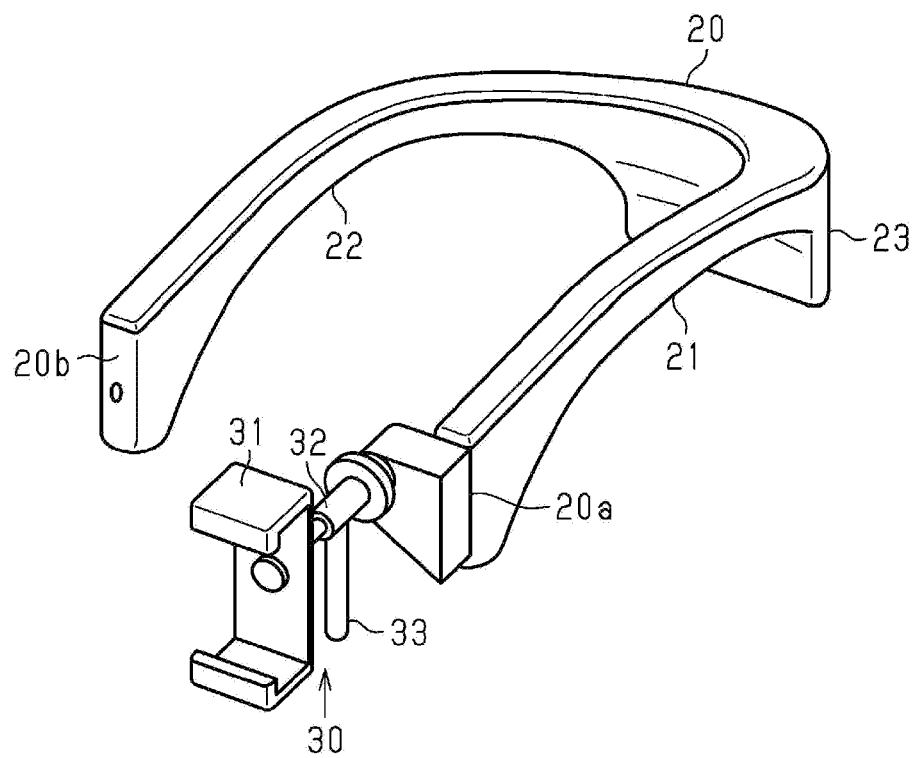
FIG. 9 illustrates an oblique structure of the wearable apparatus according to a modification.

As shown in FIG. 9, the support 30 may include a handle 33. The handle 33 can be gripped by the user when the wearable apparatus is used. By the user gripping the handle 33, the positions of the support 30 and the image capture terminal device 50 are stabilized. Thus, image capturing using the image capture terminal device 50 becomes smooth. Changing an angle or length of the support 30 becomes easier because the changes is performed by holding the handle 33. The handle 33 may be included in a position where the user can grip the handle 33. For example, the handle 33 may extend downward from the connector 32.

Figure 10:
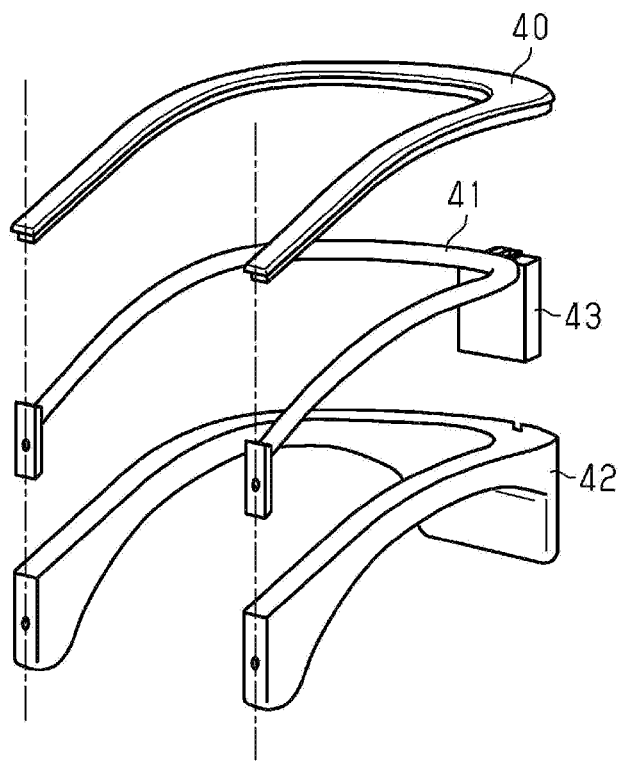
FIG. 10 illustrates an exploded perspective view of the structure of body of the wearable apparatus according to the modification.

The body 20 may include a structure in which the exterior part is assembled to a frame. For example, as shown in FIG. 10, the body 20 includes an upper exterior part 40, a frame 41, and a lower exterior part 42. The body 20 is assembled such that the frame 41 is housed in a space surrounded by the upper exterior part 40 and the lower exterior part 42. The upper exterior part 40 and the lower exterior part 42 may for example be made of a resin, and the frame 41 may for example be made of a metal. The lower exterior part 42 may include a concavity which accommodates the frame 41, and the concavity may be covered by the upper exterior part 40. Therefore, a space for surrounding the frame 41 is formed.

The frame 41 has a U-shape corresponding to the shape of the body 20. The frame 41 includes a weight portion 43 which is arranged at a central portion of the curved portion 23 of the body 20. The weight portion 43 is arranged at the central portion of the curved portion 23, that is, a central portion in a length of the body 20. Therefore, the central portion of the body 20 has a weight per volume larger than the rest of the body 20. For example, the body 20 may be configured such that the weight per volume of the body 20 changes in a length of the body 20 as thickness of the frame 41 in a length of the frame 41 changes.

With this configuration, the body 20 is more easily formed than the case in which a plurality of parts are connected in the length of the body 20 to form the body 20. This is because the body 20 in the present configuration has a structure in which the exterior part is assembled to the frame in which the weight is adjusted in the length of the body 20. The wearable apparatus is easily mass produced because the frame and the exterior part are separately produced and then they are assembled to form the body 20.

The weight of the body 20 may be larger in three portions; in the central portion and the end portions in the length of the body 20, i.e., in the central portion of the curved portion 23, in the vicinity of the first end 20a of the first side portion 21, and in the vicinity of the second end 20b of the second side portion 22, than the rest of the body 20. For example, the body 20 may have weight added at the central portion of the curved portion 23, in the vicinity of the first end 20a of the first side portion 21, and in the vicinity of the second end 20b of the second side portion 22.

With this configuration, the portion of the wearable device that contacts the lower part of the nape of the neck on the rear side of the user, and the ends of the portions that contact the chest of the user on the front side of the user, are likely to remain in contact with the user. In other words, the position of the wearable apparatus with respect to the user can be easily stabilized because at the central portion, the first end portion, and the second end portion of length of the body 20, i.e., at three ends in the longitudinal direction, the body 20 easily makes close contact at the three portions. As heavy portions of the body 20 are arranged to the front and rear of the user, the center of gravity of the wearable apparatus is prevented from being unbalanced to either of the front and rear of the user. Therefore, a position of the wearable apparatus is stabilized, and the weight of the wearable apparatus is prevented from being applied excessively to either the front or rear of the user. Thus, the load applied to the user is mitigated. Such a configuration is especially beneficial when the weight of the image capture terminal device 50 and the battery to the wearable apparatus are small, and when the influence of the weights of the image capture terminal device 50 and the battery are small.

In the above configuration, the center of gravity of the body 20 is arranged in the vicinity of the central portion of the body 20 in the longitudinal direction, i.e., in the vicinity of the boundary portion between the curved portion 23 and the first side portion 21, and in the vicinity of the boundary portion between the curved portion 23 and the second side portion 22. In other words, the center of gravity of the body 20 is arranged at portions of the body 20 contacting the shoulders of the user. In contrast, the heavier portions portion of the body 20 are located at the ends of the body 20 in the longitudinal direction, instead of at the center of gravity position. As described above, the center of gravity is arranged at the central portion of the body 20 in the longitudinal direction, and the heavier portions of the body 20 are arranged at the ends of the body 20 in the longitudinal direction. With this configuration, the position of the wearable apparatus is easily stabilized, and the burden applied to the user is mitigated when the wearable apparatus is worn by the user.

The center of gravity of the wearable apparatus is located preferably within the range given below. The center of gravity here refers to a center of gravity of a structure composed of the body 20 and the support 30, in a state where the image capture terminal device 50 and the battery are not assembled thereto.

In plan view of the wearable apparatus as viewed from just above the wearable apparatus which is placed to be stationary on a horizontal plane, the body 20 has a first end and a second end which are opposed to each other in a reference direction that is a direction in which the first side portion 21 and the second side portion 22 extend, the first end of the body is defined as a front end where the first end 20a on the first side portion 21 and the second end 20b on the second side portion 22 are located, the second end of the body is defined as a rear end where the curved portion 23 is located. When a location of the center of gravity of the wearable apparatus in the above plan view is defined as a center-of-gravity position, the distance from the front end to the center-of-gravity position in the reference direction is more than 0.5 times and less than 0.8 times, and more preferably 0.6 times or more and 0.7 times or less a distance from the front end to the rear end in the reference direction. By positioning the center of gravity within the above range, the position of the wearable apparatus can easily be stabilized when worn by the user.

(Second Modification)

Figure 11:
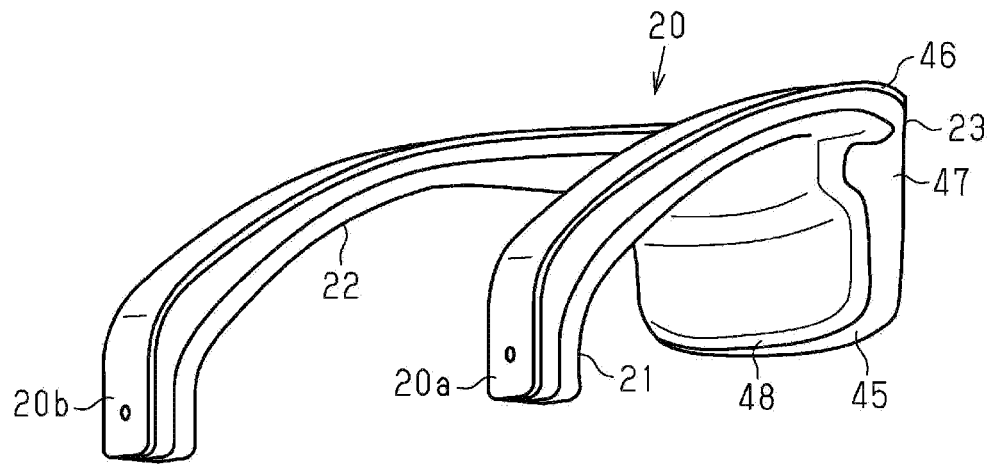
FIG. 11 illustrates an oblique structure of the wearable apparatus according to the modification.

A portion of the body 20 in which the wearable apparatus contacts the user when the wearable apparatus is worn by the user may be composed of a material having flexibility. For example, as shown in FIG. 11, the body 20 may include a cushion 48. The cushion 48 is located on a bottom surface of the first side portion 21, a bottom surface of the second side portion 22, and a front surface of the curved portion 23. The cushion 48 is formed of urethane or a mesh material and has elasticity.

In an example shown in FIG. 11, the body 20 includes an upper surface portion 46 consisting an upper surface of the body 20, a core material portion 47 connected to the upper surface portion 46, and the cushion 48. The core material portion 47 has a shape corresponding to an outer shape of the first side portion 21, the second side portion 22, and the curved portion 23, and has a surface where the cushion 48 is mounted. The upper surface portion 46 and the core material portion 47 are made of resin or metal, for example. The cushion 48 may cover not only the portion contacting the user but also the entire surface of the core material portion 47.

With this configuration, a portion of the body 20 which contacts the user has flexibility, and thus the portion is easily deformed along the body shape of the user. Thus, a position of the wearable apparatus with respect to the user easily becomes stable when the wearable apparatus is worn by the user. Compared with the case in which the portion of the body 20 contacting the user is hard, a sense of uneasy caused by the wearable apparatus contacting the body of the user is prevented from being felt by the user.

A portion including the central portion of the curved portion 23 preferably protrudes lower than a portion near the protrusion. That is, the curved portion 23 includes a protrusion 45 which is a portion projected lower than the rest of portions. The protrusion 45 preferably includes a central portion of the length of the curved portion 23. For example, the height of the protrusion 45 is preferably two times or more of an average value of a height between the upper surface and the lower surface, of the first side portion 21 and the second side portion 22. With this configuration, a region where the curved portion 23 contacts the user is largely secured with ease in the vicinity of the lower part of the nape of the neck of the user. Thus, the position of the wearable apparatus can easily be stabilized. Furthermore, the body 20 can easily have weight added in order to increase weight in the central portion of the curved portion 23 because the volume of the central portion of the curved portion 23 is large.

Figure 12:
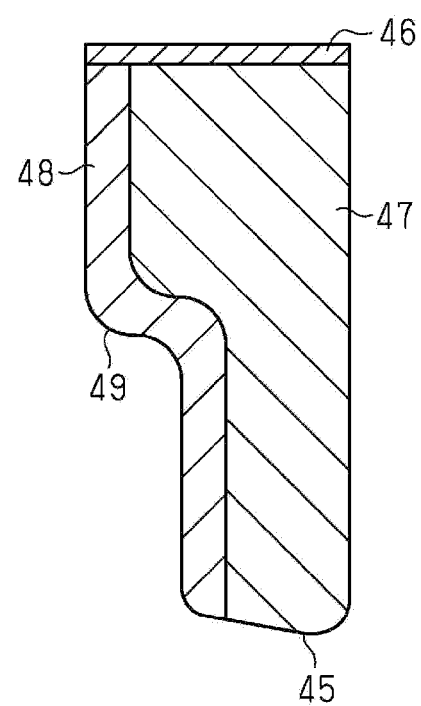
FIG. 12 illustrates a cross sectional structure of the wearable apparatus according to the modification.

Furthermore, as shown in FIG. 12, the protrusion 45 preferably includes a level difference 49 at the front surface of the protrusion 45. That is, the level difference 49 is formed on a surface contacting the user. With regard to a thickness in the longitudinal direction of the protrusion 45, a portion below the level difference 49 is thinner than a portion above the level difference 49. Accordingly, a gap is easily formed between the lower portion of the protrusion 45 and the user.

The shape of the lower part of the nape of the neck of the user, i.e., the shape of the back close to the neck of the user, is different between the users. Thus, if a surface of the protrusion 45 contacting the user, i.e., a front surface, is formed to be a curved surface or a plane surface which are simple shapes, it is difficult to form the front surface to be one making close contact with a variety of users. As a result, a gap-forming position between the protrusion 45 and the user is different between users. Also, a portion of the protrusion 45 which contacts the user is different between users. Thus, there is a limitation on stabilizing the position of the body 20 to a variety of users.

In contrast, by providing the level difference 49 to the protrusion 45, a specific portion of the protrusion 45 such as a corner portion of the level difference 49 easily makes contact with the user, and a gap may easily be formed between the specific portion of the protrusion 45 such as a lower portion of the protrusion 45 and the user, regardless of the difference in body shapes between the users. In other words, the portion of the protrusion 45 which contacts the user is prevented from varying for each user. Moreover, the portion contacting the user is easily set. Thus, the position of the body 20 can easily be stabilized for a number of users.

The nape of the neck and the back of the user also include the spine. The protrusion 45 has the level difference 49. Therefore, the position of the body 20 can easily be stabilized since the level difference 49 is supported by the spine.

The above configuration of the protrusion 45 is applicable regardless of the material of the body 20 or method for manufacturing the body 20, and is also applicable to the above embodiment and the first modification.

(Other Modification)

The image capture terminal device 50 may be mountable on both the first end 20a and the second end 20b. The user may select one of the two ends for mounting the image capture terminal device 50. For example, the support 30 may be configured to be detachable at both the first end 20a and the second end 20b. Alternatively, the support 30 may be connected to both the first end 20a and the second end 20b. With this configuration, the user can select whether the image capture terminal device 50 is mounted on a right side or a left side of the wearable apparatus, as appropriate. Thus, the user convenience can be enhanced.

If the image capture terminal device 50 is attachable to both the first end 20a and the second end 20b, both of the first side portion 21 and the second side portion 22 of the wearable apparatus may preferably accommodate the batteries. In other words, the wearable apparatus preferably includes the housing 24 in both the first side portion 21 and the second side potion 22. Then, of the first side portion 21 and the second side portion 22, the battery may be housed in a housing 24 which is located at a portion extending from an end opposing the end where the image capture terminal device 50 is mounted. Thereby, even if the end portions for mounting the image capture terminal device 50 are optionally selected, the image capture terminal device 50 and the battery are arranged at different ends from each other. Thus, the center of gravity is prevented from being unbalanced to either the left or right of the wearable apparatus.

The image capture terminal device 50 may be mounted on both the first end 20a and the second end 20b simultaneously. In that case, batteries may be housed in both the first side portion and the second side portion simultaneously.

Regardless of the image capture terminal device 50 being mountable on either of the ends, the support 30 may be detachable from the body 20. Furthermore, the support 30 connected to the body 20 may be replaceable by a support 30 including a holder 31 which has a structure corresponding to a model or the like of the image capture terminal device 50. The support 30 may include a detachable accessory member for adjusting the length of the connector 32. The accessory member may be mounted or dismounted in accordance with an intended use or a use environment of the wearable apparatus. In summary, the wearable apparatus is configured such that the image capture terminal device 50 is mountable on at least one of the first end 20a and the second end 20bs via the support 30 which is fixed to or detachable from the body 20.

The connector 32 of the support 30 may be configured such that only one of the position and the angle of the holder 31 is adjustable. Furthermore, the position and the angle of the holder 31 of the support 30 may be fixed. That is, the support 30 may at least have the function of supporting the image capture terminal device 50 to connect the image capture terminal device 50 with the body 20.

In accordance with a body shape of the user, at least one of the length of the first side portion 21, the length of the second side portion 22, and the length of the curved portion 23 may be adjustable. Furthermore, an angle of the bottom surface of the first side portion 21 and the second side portion 22 with respect to the user, or an angle of the front surface of the curved portion 23 with respect to the user may be adjustable.

The weight added to the curved portion 23 or the like of the body 20 may be detachable.

The position of the housing 24 may be different from the above embodiment. The wearable apparatus may include a plurality of housings 24 to accommodate a plurality of batteries for a single image capture terminal device 50. In this case, at least one of the housings 24 may be located at the curved portion 23. Alternatively, according to an intended use or the like of the wearable apparatus, the wearable apparatus may not include the housing 24. Such a case may be one in which the image capture terminal device 50 does not require the battery to supply electric power; for example, a case in which a continuously usable time of the wearable apparatus is short.

If the wearable apparatus includes the vibration generation unit, the wireless communication unit, or the like, the wearable apparatus may include a controller which controls an electronic configuration of the wearable apparatus. The controller may for example include a hardware element and a software. The hardware element may be used in a computer, such as a CPU, a RAM, or a ROM. The controller is not limited to one in which the various types of processing are entirely executed by the software. For example, the controller may include dedicated hardware (application specific integrated circuit, ASIC) that executes part of the various types of processing. The controller may be configured as a circuit including one or more dedicated hardware circuits such as an ASIC, one or more processors, i.e., microcomputers that operate according to computer programs, i.e., software, or a combination thereof.

According to the intended use or the use environment of the wearable apparatus, the wearable apparatus 10 may not include at least one of the sound emitter 25 and the sound receiver 26. Such a case may be one in which no transmission of information via sound is required, or one in which the user receives or utters sound using the image capture terminal device 50 itself The image capture terminal device 50 includes at least the image capture function and the communication function. Other functions are not particularly limited. For example, the image capture terminal device 50 may not include the display unit 53, or images may not be displayed on the display unit 53 while the image capture terminal device 50 is attached to the wearable device and used.

The wearable apparatus may be mounted not only on humans but also humanoid robots.

The present application addresses the following. Due to rapidly growing communication technology in an environment where communication infrastructure is provided and diversifying image capture technology, the wearable apparatus provided with the communication and image capture function now requires flexibility responding to changes in communication and image capture technology.

An aspect of the present disclosure is to provide a wearable apparatus that can flexibly respond to changes in technology.

A wearable apparatus includes a body having a U-shape, a curved portion, a first side portion, and a second side portion, the curved portion having a first end and a second end, the first side portion extending from the first end of the curved portion, and the second side portion extending from the second end of the curved portion, the body being configured to be wearable such that the curved portion can be worn on a nape of a neck of a user, and the first side portion and the second side portion are suspended from shoulders of the user, wherein the body has a first end that is an end of the first side portion, and has a second end that is an end of the second side portion, the body being configured such that a terminal device having an image capture function and a communication function is mountable on at least one of the first end of the first side portion and the second end of the second side portion.

The above-described configuration can flexibly respond to technological changes because the present configuration is applicable for technological changes such as an improvement of function by selecting a terminal device mountable on the wearable apparatus, compared to a configuration in which the wearable apparatus itself has an image capture function and a transmission function.

In the above configuration, the wearable apparatus may further include a support connected to at least the one of the first end of the first side portion and the second end of the second side portion, wherein the support is configured to support the terminal device, and at least one of a position or an angle of the terminal device with respect to the body is changeable.

With the above configuration, the support is used to adjust the position or the angle of the terminal device to adjust an image capture area of the terminal device. Thus, the user convenience is enhanced.

In the above configuration, the support may be configured to support the terminal device and be detachable from each of the first end of the first side portion and the second end of the second side portion.

With the above configuration, the user of the wearable apparatus can appropriately select an end on which the terminal device is mounted between a right side end and a left side end on the front. Thus, user convenience is enhanced.

In the above configuration, one of the first side portion having the first end of the first side portion to which the terminal device is mountable and the second side portion having the second end of the second side portion to which the terminal device is mountable may include a housing which is capable of accommodating a battery providing electric power to the terminal device.

With the above configuration, a center of gravity of the wearable apparatus is prevented from being inclined to either of left and right, in a state in which the terminal device and the battery is mounted on the wearable apparatus. Thus, a position of the wearable apparatus easily becomes stable when worn by the user.

In the above configuration, the wearable apparatus may further include at least one of a sound emitter and a sound receiver, the sound emitter emitting a sound in response to a first signal from the terminal device, and the sound receiver converting a sound received by the sound receiver into a second signal and outputting the second signal to the terminal device.

With the above configuration, through transmission and reception of sound information using the terminal device, the user of the wearable apparatus can communicate with an outside space using sound.

In the above configuration, the weight per unit volume of the body may be the largest at a central portion in the extending direction of the body.

With the above configuration, in a state in which the terminal device and the battery are mounted on the wearable apparatus, the center of gravity is prevented from being inclined forward of the user. Accordingly, when worn, the position of the wearable device can be easily stabilized, and the burden on the nape of the neck of the user can be reduced.

In the above configuration, the weight per volume of the body may be decreased from the central portion of the body to each of the first end and the second end of the body.

With the above configuration, in a state in which the terminal device and the battery are mounted on the wearable apparatus, the center of gravity is more accurately prevented from being inclined forward of the user.

In the above configuration, the weights of the central portion and both end portions in the extending direction of the body may be larger than other portions of the body.

With the above configuration, those three portions, that is the central portion, the first end portion, and the second end portion, of the body, easily make close contact with the user. Therefore, the position of the wearable apparatus on the user can be easily stabilized. As heavy portions of the body are arranged in front of and behind the user, the center of gravity of the wearable apparatus is prevented from being biased to one of the front side and the back side of the user. As a result, the position of the wearable apparatus is stabilized, and the weight of the wearable apparatus is prevented from being biased toward either the front side or the back side of the user. Therefore, a burden imposed on the user when wearing the device is mitigated.

In the above configuration, the curved portion may have a protrusion including a central portion of the curved portion, and the protrusion may be projected lower than a portion around the protrusion.

According to the above configuration, a large area of the curved portion can easily contact the user near the lower part of the nape of the neck of the user. Thus, the position of the wearable apparatus can easily be stabilized.

In the above configuration, if the body has a first end and a second end which are opposed to each other in a reference direction that is a direction in which the first side portion and the second side portion extend, if the first end of the body is defined as a front end where the first end of the first side portion and the second end of the second side portion lie, if the second end of the body is defined as a rear end where the curved portion lies, and if a location of a center of gravity of the wearable apparatus is defined as a center-of-gravity position, in a plan view of the wearable apparatus as viewed from just above the wearable apparatus which is placed to be stationary on a horizontal plane, a distance from the front end to the center-of-gravity position in the reference direction may be more than 0.5 times and less than 0.8 times of a distance from the front end to the back end in the reference direction.

With the above configuration, since the center of gravity of the wearable apparatus is prevented from being biased toward either of the front side and the back side of the user, the position of the wearable apparatus can easily be stabilized.

According to the present disclosure, the wearable apparatus can flexibly respond to technological changes.

REFERENCE SIGNS LIST

10 . . . Wearable apparatus
20 . . . Body
20a . . . First end
20b . . . Second end
21 . . . First side portion
22 . . . Second side portion
23 . . . Curved portion
24 . . . Housing
25 . . . Sound emitter
26 . . . Sound receiver
30 . . . Support
31 . . . Holder
32 . . . Connector
33 . . . Handle
40 . . . Upper exterior part
41 . . . Frame
42 . . . Lower exterior part
43 . . . Weight
45 . . . Protrusion
46 . . . Upper surface portion
47 . . . Core material portion
48 . . . Cushion
49 . . . Level difference
50 . . . Image capture terminal device.

Obviously, numerous modifications and variations of the present invention are possible in light of the above teachings. It is therefore to be understood that within the scope of the appended claims, the invention may be practiced otherwise than as specifically described herein.

What is claimed is:

1. A wearable apparatus, comprising:
a body having a U-shape, a curved portion, a first side portion, and a second side portion, the curved portion having a first end and a second end, the first side portion extending from the first end of the curved portion, and the second side portion extending from the second end of the curved portion, the body being configured to be wearable such that the curved portion is worn on a nape of a neck of a user, and that the first side portion and the second side portion are suspended from shoulders of the user,
wherein the body has a first end that is an end of the first side portion, and a second end that is an end of the second side portion, the body is configured such that a terminal device having an image capture function and a communication function is mountable to at least one of the first end of the first side portion and the second end of the second side portion, and one of the first side portion and the second side portion, having the one of the first end of the first side portion and the second end of the second side portion to which the terminal device is not to be mounted, includes a housing configured to house a battery providing electric power to the terminal device.

2. The wearable apparatus according to claim 1, further comprising
a support connected to at least the one of the first end of the first side portion and the second end of the second side portion,
wherein the support is configured to support the terminal device, and at least one of a position or an angle of the terminal device relative to the body is changeable.

3. The wearable apparatus according to claim 1, wherein the support is configured to support the terminal device and be detachable from each of the first end of the first side portion and the second end of the second side portion.

4. The wearable apparatus according to claim 1, further comprising
at least one of a sound emitter and a sound receiver,
wherein the sound emitter is configured to emit a sound in response to a first signal from the terminal device, and the sound receiver is configured to convert a sound received by the sound receiver into a second signal and output the second signal to the terminal device.

5. The wearable apparatus according to claim 1, wherein the body has a weight per volume which is largest in a central portion of a length of the body.

6. The wearable apparatus according to claim 5, wherein the weight per volume of the body decreases from the central portion of the body to each of the first end of the first side portion and the second end of the second side portion.

7. The wearable apparatus according to claim 1, wherein weights of the central portion, the first end of the first side portion, and the second end of the second side portion, of the length of the body, are higher than a rest of the body.

8. The wearable apparatus according to claim 1, wherein the curved portion has a protrusion including a central portion of the curved portion, and the protrusion is projected lower than portions around the protrusion.

9. The wearable apparatus according to claim 1, wherein the body has a front end and a rear end which are opposed to each other in a reference direction in which the first side portion and the second side portion extend, the front end of the body is an end portion where the first end of the first side portion and the second end of the second side portion are present, the rear end of the body is an end portion where the curved portion is present, a location of a center of gravity of the wearable apparatus is defined as a center-of-gravity position, and in a plan view of the wearable apparatus as viewed from right above the wearable apparatus placed to be stationary on a horizontal plane, a distance from the front end to the center-of-gravity position in the reference direction is more than 0.5 times and less than 0.8 times of a distance from the front end to the back end in the reference direction.

10. A wearable apparatus, comprising:
at least one of a sound emitter and a sound receiver; and
a body having a U-shape, a curved portion, a first side portion, and a second side portion, the curved portion having a first end and a second end, the first side portion extending from the first end of the curved portion, and the second side portion extending from the second end of the curved portion, the body being configured to be wearable such that the curved portion is worn on a nape of a neck of a user, and that the first side portion and the second side portion are suspended from shoulders of the user,
wherein the body has a first end that is an end of the first side portion, and a second end that is an end of the second side portion, the body is configured such that a terminal device having an image capture function and a communication function is mountable to at least one of the first end of the first side portion and the second end of the second side portion, the sound emitter is configured to emit a sound in response to a first signal from the terminal device, and the sound receiver is configured to convert a sound received by the sound receiver into a second signal and output the second signal to the terminal device.

11. The wearable apparatus according to claim 10, further comprising
a support connected to at least the one of the first end of the first side portion and the second end of the second side portion,
wherein the support is configured to support the terminal device, and at least one of a position or an angle of the terminal device relative to the body is changeable.

12. The wearable apparatus according to claim 10, wherein the support is configured to support the terminal device and be detachable from each of the first end of the first side portion and the second end of the second side portion.

13. The wearable apparatus according to claim 10, wherein the body has a weight per volume which is largest in a central portion of a length of the body.

14. The wearable apparatus according to claim 13, wherein the weight per volume of the body decreases from the central portion of the body to each of the first end of the first side portion and the second end of the second side portion.

15. The wearable apparatus according to claim 10, wherein the body has a front end and a rear end which are opposed to each other in a reference direction in which the first side portion and the second side portion extend, the front end of the body is an end portion where the first end of the first side portion and the second end of the second side portion are present, the rear end of the body is an end portion where the curved portion is present, a location of a center of gravity of the wearable apparatus is defined as a center-of-gravity position, and in a plan view of the wearable apparatus as viewed from right above the wearable apparatus placed to be stationary on a horizontal plane, a distance from the front end to the center-of-gravity position in the reference direction is more than 0.5 times and less than 0.8 times of a distance from the front end to the back end in the reference direction.

16. A wearable apparatus, comprising:
a body having a U-shape, a curved portion, a first side portion, and a second side portion, the curved portion having a first end and a second end, the first side portion extending from the first end of the curved portion, and the second side portion extending from the second end of the curved portion, the body being configured to be wearable such that the curved portion is worn on a nape of a neck of a user, and that the first side portion and the second side portion are suspended from shoulders of the user,
wherein the body has a first end that is an end of the first side portion, and a second end that is an end of the second side portion, the body is configured such that a terminal device having an image capture function and a communication function is mountable to at least one of the first end of the first side portion and the second end of the second side portion, the curved portion has a protrusion including a central portion of the curved portion, and the protrusion is projected lower than portions around the protrusion.

17. The wearable apparatus according to claim 16, further comprising
a support connected to at least the one of the first end of the first side portion and the second end of the second side portion,
wherein the support is configured to support the terminal device, and at least one of a position or an angle of the terminal device relative to the body is changeable.

18. The wearable apparatus according to claim 16, wherein the support is configured to support the terminal device and be detachable from each of the first end of the first side portion and the second end of the second side portion.

19. The wearable apparatus according to claim 16, wherein the body has a weight per volume which is largest in a central portion of a length of the body.

20. The wearable apparatus according to claim 16, wherein the body has a front end and a rear end which are opposed to each other in a reference direction in which the first side portion and the second side portion extend, the front end of the body is an end portion where the first end of the first side portion and the second end of the second side portion are present, the rear end of the body is an end portion where the curved portion is present, a location of a center of gravity of the wearable apparatus is defined as a center-of-gravity position, and in a plan view of the wearable apparatus as viewed from right above the wearable apparatus placed to be stationary on a horizontal plane, a distance from the front end to the center-of-gravity position in the reference direction is more than 0.5 times and less than 0.8 times of a distance from the front end to the back end in the reference direction.

* * * * *